(12) United States Patent
Zimmerman et al.

(10) Patent No.: US 7,533,127 B2
(45) Date of Patent: May 12, 2009

(54) SYSTEM AND METHOD FOR MANAGING ELECTRONIC PRICE LABEL OVERLAYS

(75) Inventors: Terry Lee Zimmerman, Lawrenceville, GA (US); John C. Goodwin, III, Suwanee, GA (US); Scott A Bitner, Buford, GA (US); Christopher M Haynes, Doraville, GA (US); Gregory H. Campbell, Norcross, GA (US); Kelly S. Harrelson, Atlanta, GA (US)

(73) Assignee: NCR Corporation, Dayton, OH (US)

( * ) Notice: Subject to any disclaimer, the term of this patent is extended or adjusted under 35 U.S.C. 154(b) by 661 days.

(21) Appl. No.: 10/895,756

(22) Filed: Jul. 21, 2004

(65) Prior Publication Data
US 2004/0267699 A1    Dec. 30, 2004

Related U.S. Application Data

(63) Continuation of application No. 08/646,565, filed on May 8, 1996, now abandoned.

(51) Int. Cl.
*G06F 17/00*    (2006.01)

(52) U.S. Cl. .................. 707/104.1; 707/101; 707/102; 707/103 R

(58) Field of Classification Search ............... 707/1–10, 707/100–104.1, 200–206
See application file for complete search history.

(56) References Cited

U.S. PATENT DOCUMENTS

| 5,162,639 | A | * | 11/1992 | Sugiyama | .................. 235/383 |
| 5,473,146 | A | | 12/1995 | Goodwin, III | |
| 5,602,377 | A | * | 2/1997 | Beller et al. | ........... 235/462.15 |
| 5,751,919 | A | | 5/1998 | Goodwin, III | |
| 5,920,685 | A | | 7/1999 | Romano et al. | |
| 6,016,481 | A | | 1/2000 | Failing, Jr. et al. | |

* cited by examiner

*Primary Examiner*—Isaac M Woo
(74) *Attorney, Agent, or Firm*—Paul W. Martin

(57) ABSTRACT

A system and method of managing data for electronic price label overlays which automates printing of new and changed overlays. The method determines electronic price label information and price look-up file descriptions that have been added or changed for particular electronic price labels. Additions and changes in overlay data are marked and identified by the marks to create a print data file. Alternatively, additions and changes are identified by a comparison of a first file with a second file containing the additions and changes. The system includes a number of storage media for storing the PLU file and the EPL data file, and a computer which determines a change in the PLU file or the EPL data file and which creates the print file for printing an overlay for the change in the PLU file and EPL data file.

12 Claims, 11 Drawing Sheets

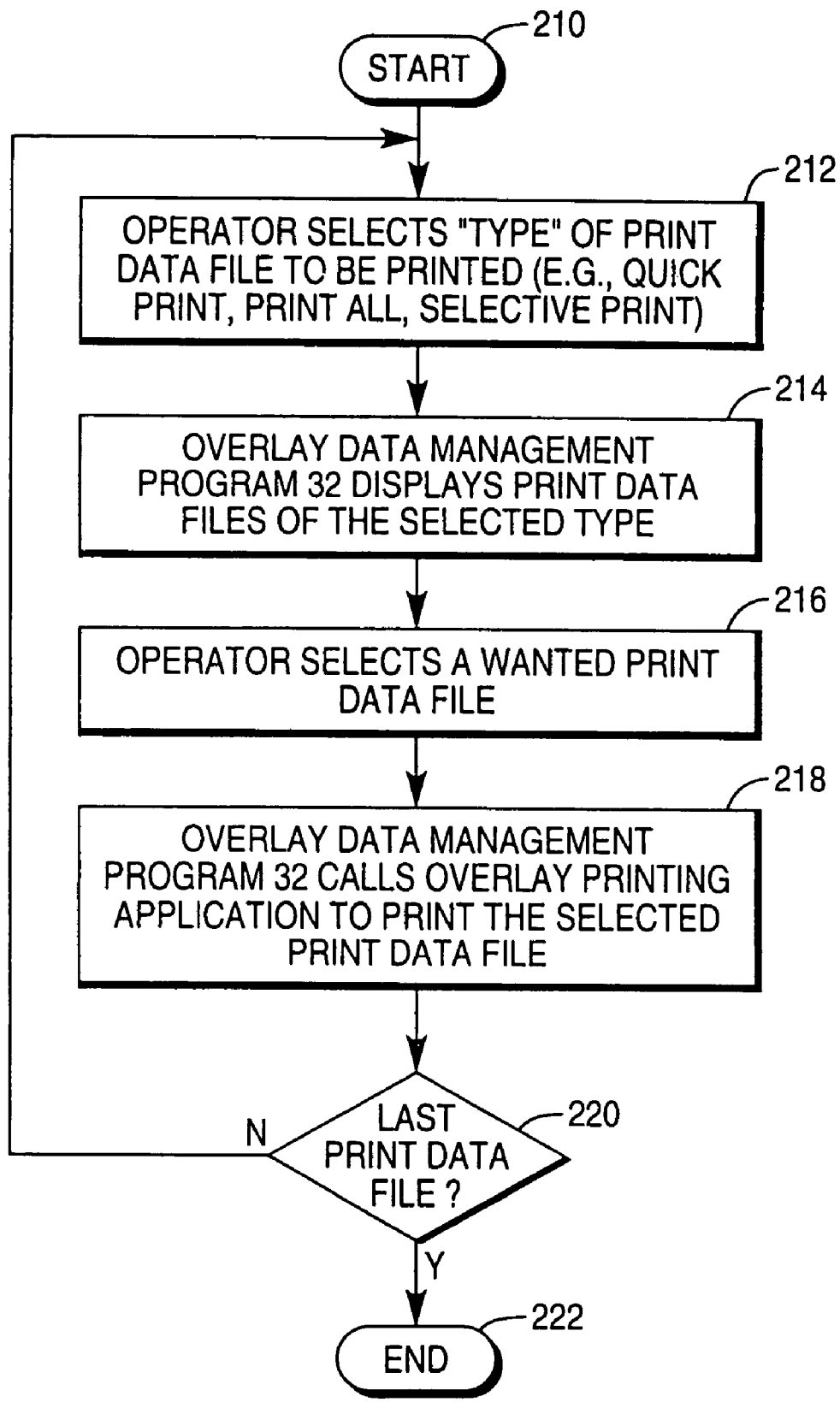

SYSTEM AND METHOD FOR MANAGING ELECTRONIC PRICE LABEL OVERLAYS

CROSS REFERENCE TO RELATED APPLICATION

This application is a continuation of U.S. application Ser. No. 08/646,565, filed May 8, 1996. The present invention is related to commonly assigned and U.S. application entitled, "System And Method For Printing Overlays for Electronic Display Devices," invented by Goodwin, and having a U.S. Ser. No. of 09/223,259, now U.S. Pat. No. 5,751,919, issued May 12, 1998.

BACKGROUND OF THE INVENTION

The present invention relates to electronic displays such as electronic shelf labels, and more specifically to a system and method for managing electronic price label overlays.

Electronic shelf label systems typically include a plurality of electronic price labels (EPLs) for each item in a store. The EPLs are coupled to a central server from where prices for all of the displays can be changed.

In order to reduce the cost of such systems, only a limited amount of information, including price information, is displayed electronically. Item descriptions and product codes are not likely to change. Therefore, such information is typically displayed through signs or overlays attached to the electronic shelf label.

A store employee must provide a new overlay each time a new product is added and information for an existing product changes. Determining when an overlay's information is incorrect and updating information for the overlay are labor-intensive processes. An operator views the existing overlay and records information, with changes, for a new overlay.

Therefore, it would be desirable to provide a system and method for managing electronic price label overlays that automatically schedules printing of new overlays.

SUMMARY OF THE INVENTION

In accordance with the teachings of the present invention, a system and method of managing electronic price label overlays is provided.

A system and method of managing data for electronic price label overlays which automates printing of new and changed overlays. The method determines electronic price label information and price look-up file descriptions that have been added or changed for particular electronic price labels. Additions and changes in overlay data are marked and identified by the marks to create a print data file. Alternatively, additions and changes are identified by a comparison of a first file with a second file containing the additions and changes.

The system includes a number of storage media for storing the PLU file and the EPL data file, and a computer which determines a change in the PLU file or the EPL data file and which creates the print file for printing an overlay for the change in the PLU file or the EPL data file.

It is accordingly an object of the present invention to provide a system and method of managing electronic price label overlays.

It is another object of the present invention to provide a system and method of managing electronic price label overlays which automatically schedules printing of new overlays.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 11 is a flow diagram illustrating a fifth printing choice within the third embodiment of FIG. 5.

DETAILED DESCRIPTION OF THE PREFERRED EMBODIMENT

Figure 1:
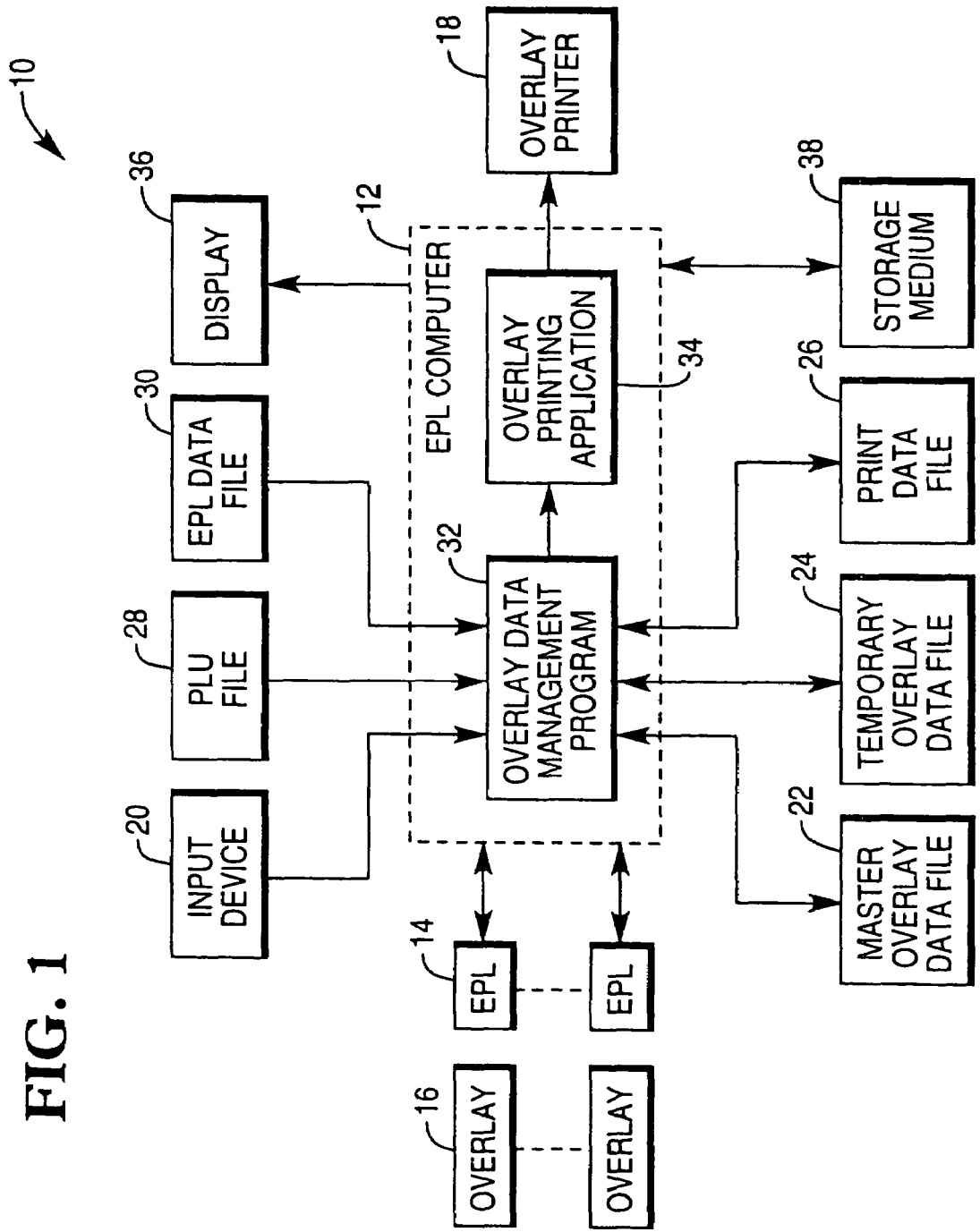
FIG. 1 is a block diagram of a first embodiment of the system of the present invention.

Referring now to FIG. 1, a first embodiment of electronic shelf label system 10 includes EPL computer 12, electronic price labels (EPLs) 14, overlays 16, and overlay printer 18.

EPL computer 12 couples to input device 20 and display 36. Input device 20 is preferably a keyboard.

EPL computer 12 controls operation of system 10. Price and other information displayed by EPLs 14 may be changed by EPL computer 12. EPL computer 12 maintains EPL data file 30, which contains identification and other information about EPLs 14. EPL computer 12 also executes overlay data management program 32 which controls printing of overlays 16 and overlay printing application 34 which prepares overlay information for printing.

Overlay data management program 32 creates master overlay data file 22, temporary overlay data file 24, and print data file 26. Overlay data management program 32 creates master overlay data file 22 when EPL system 10 is installed or when all overlay information is known to be correct. Master overlay data file 22 includes descriptions of products from PLU file 28 and information from within EPL data file 30, including PLU number, measure, unit of measure, package size, EPL serial number, and price level.

Upon receiving a command to print new or updated overlays, overlay data management program 32 creates a temporary overlay data file 24 in the same way it created master overlay data file 32. Temporary overlay data file 24 includes all new and updated descriptions of products from PLU file 28 and all new and updated information from within EPL data file 30 since creation of master overlay data file 22.

Print data file 26 is a file containing overlay information for new and updated records and results from a comparison of master overlay data file 22 with temporary overlay data file 24 by overlay data management program 32.

EPLs 14 preferably display price information for adjacent merchandise items, although additional information may also be displayed. EPLs 14 may be coupled to EPL computer 12 through wire cables or through wireless transceivers mounted in both EPLs 14 and EPL computer 12.

Overlays 16 are attached to electronic displays 14 and include printed information such as item descriptions, item bar code labels, item identification numbers, and promotional information. Overlays 16 may be made of paper or plastic, and may be attached using adhesives or special fasteners.

Overlay printer 18 prints overlays 16 upon receiving a command from overlay printing application 34. Many overlays 16 may be printed at the same time when standard letter-size adhesive paper is used.

Figure 2:
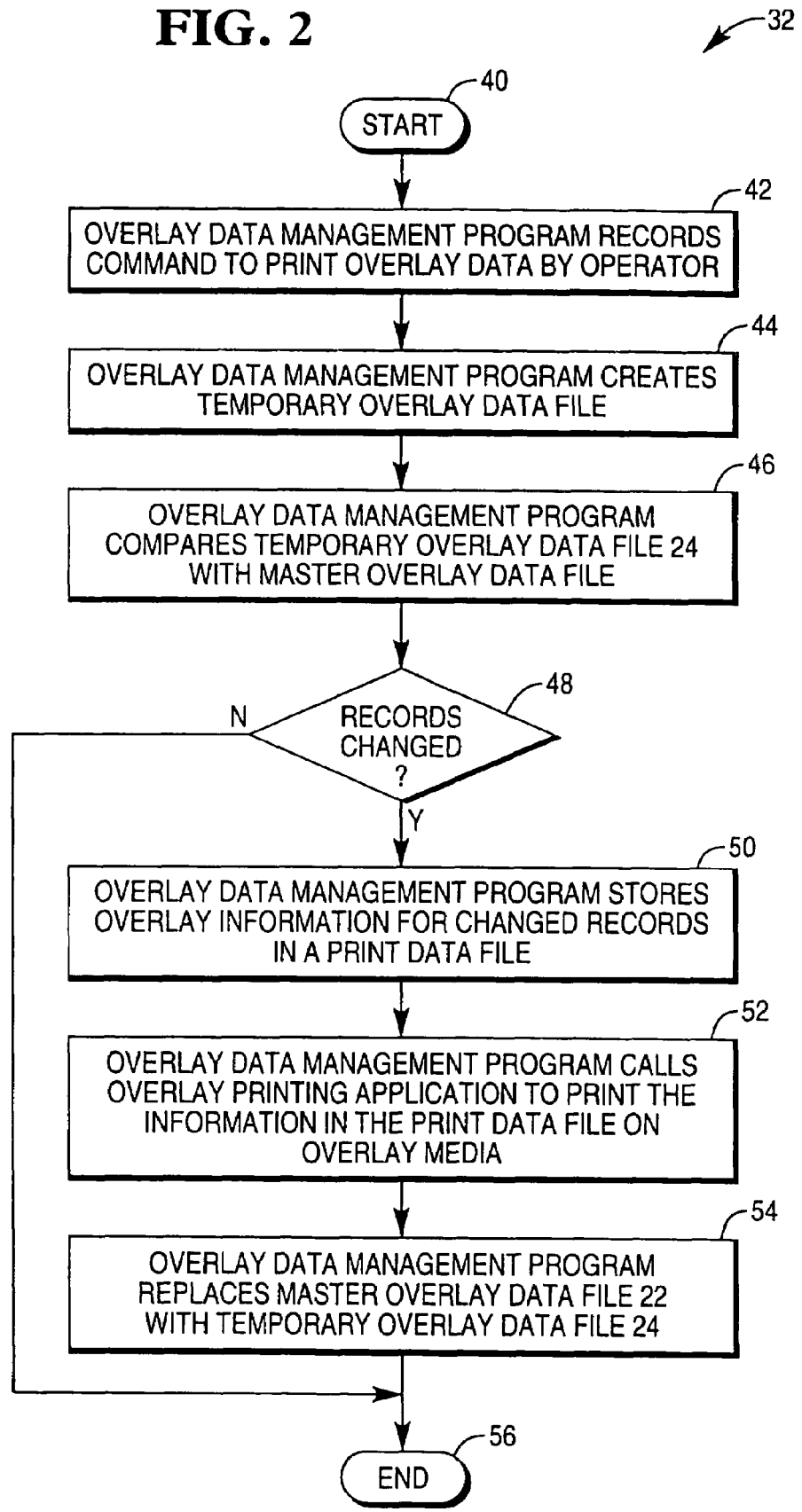
FIG. 2 is a flow diagram illustrating the operation of the first embodiment of FIG. 1.

Turning now to FIG. 2, the operation of overlay data management program 32 is illustrated in more detail beginning with START 40.

In step 42, overlay data management program 32 records a command to print overlay data. The print command may be recorded by input device 20 in response to an operator's actions or may be scheduled to occur automatically after PLU file 28 and EPL data file 30 are changed by the operator, or at any chosen time. Thus, automatic printing operation may include periodic printing to coincide with periodic price changes. Script files may be employed to implement automatic operation and to drive other user required functionalities.

In step 44, overlay data management program 32 creates temporary overlay data file 24 from a current PLU data file 28 and a current EPL data file 30.

In step 46, overlay data management program 32 compares temporary overlay data file 24 with master overlay data file 22.

In step 48, overlay data management program 32 determines whether records have been added or changed. overlay data management program 32 compares records for each EPL 14 in master overlay data file 32 with records in temporary overlay data file 24. If records have not been added or changed, the method ends in step 56.

If records have been added or changed, overlay data management program 32 stores overlay information for new and changed records in print data file 26 in step 50.

In step 52, overlay data management program 32 calls overlay printing application 34 to print the information in print data file 26 on overlay media. Overlay data management program 32 may immediately print the information or wait until a predetermined scheduled time or until a script file is executed.

In step 54, overlay data management program 32 replaces master overlay data file 22 with temporary overlay data file 24.

In step 56, the method ends.

Figure 3:
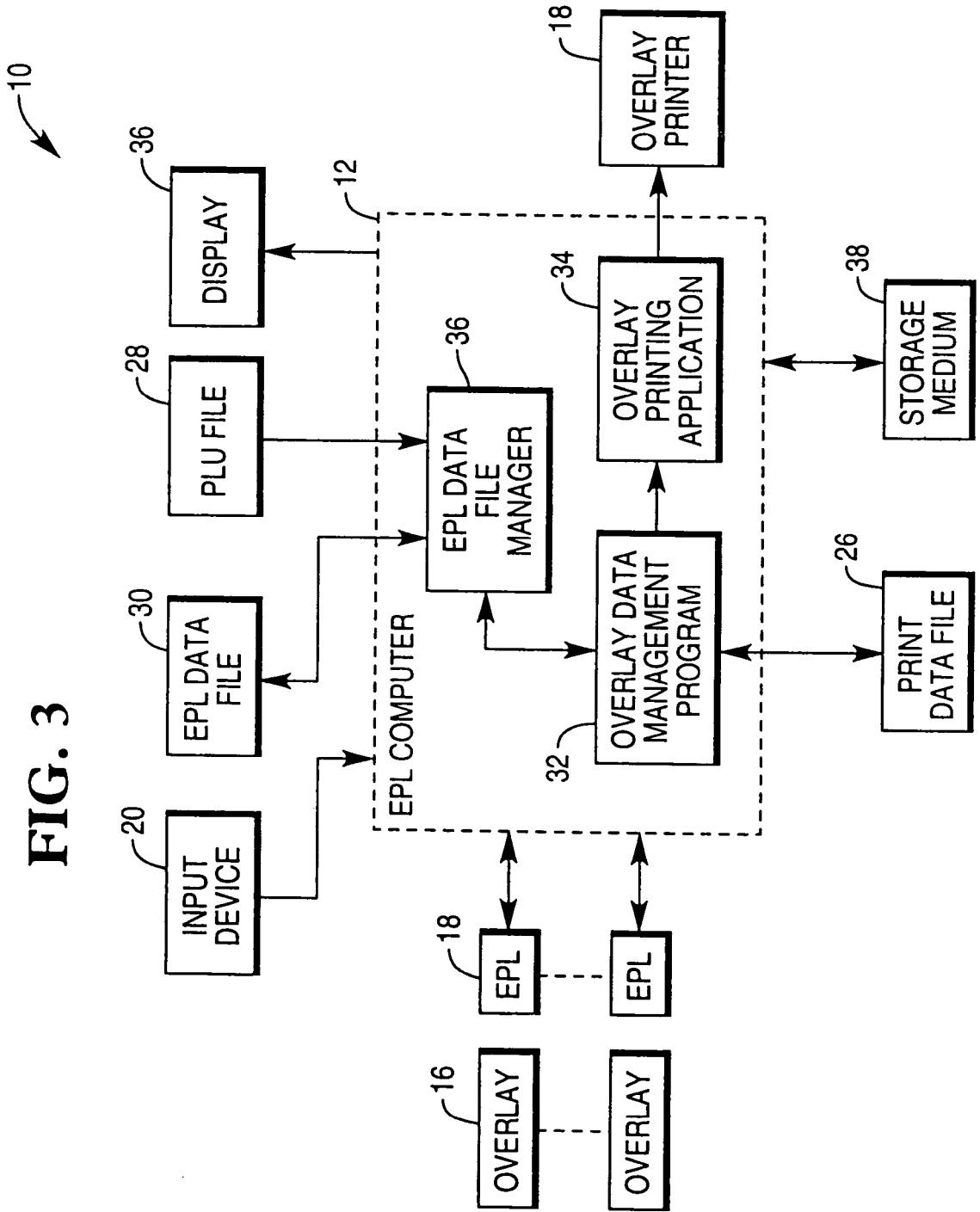
FIG. 3 is a block diagram of a second embodiment of the system of the present invention.

Referring now to FIG. 3, a second embodiment of electronic shelf label system 10 is similar to the first embodiment of FIG. 1, except that all overlay data, including PLU descriptions, are obtained from EPL data file 30. Master overlay data file 22 and temporary overlay data file 24 are not created by overlay data management program 32. In addition, EPL computer 12 executes EPL data file manager 36.

EPL data file manager 36 maintains PLU descriptions in EPL data file 30, including copying them during creation of EPL data file 30, and changes information within EPL data file 30 in response to operator input. EPL data file manager 36 marks each EPL record it adds or changes with one or more flags, or dirty bits, which are used to determine whether an associated field has changed since the last print operation.

Upon receiving a command to print new or updated overlays, overlay data management program 32 reads EPL data file 28 for records marked by dirty bits. Overlay data management application 32 creates print data file 26, which contains overlay data from the marked EPL records.

Figure 4:
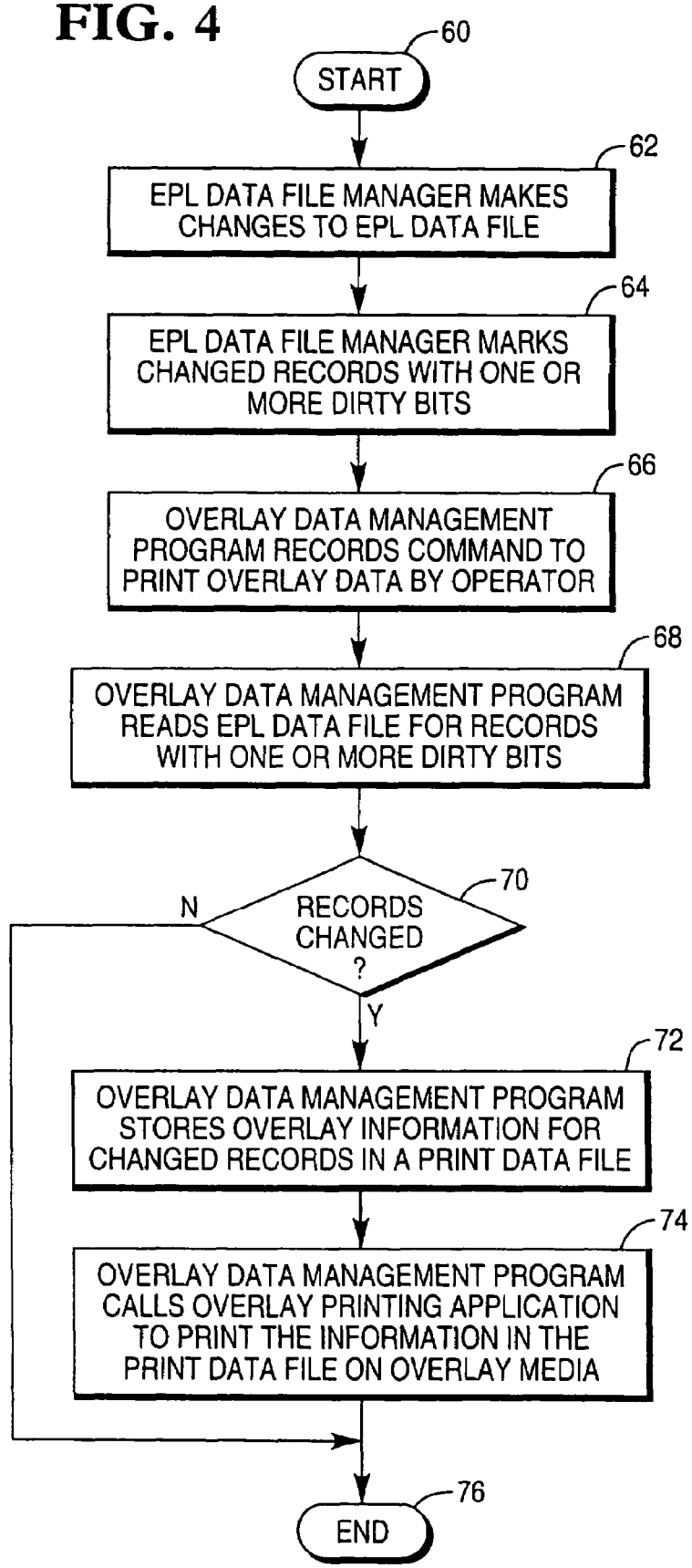
FIG. 4 is a flow diagram illustrating the operation of the second embodiment of FIG. 3.

Thus, turning now to FIG. 4, the operation of overlay data management program 32 under the second embodiment of the present invention is illustrated in more detail beginning with START 60.

In step 62, EPL data file manager 36 makes changes to EPL data file 30.

In step 64, EPL data file manager 36 marks new and changed EPL records with one or more dirty bits.

In step 66, overlay data management program 32 records a command by an operator to print overlay data.

In step 68, overlay data management program 32 reads EPL data file 30 for records marked with one or more dirty bits. If records have not been added or changed, the method ends in step 76.

If records have been added or changed, overlay data management program 32 stores overlay data for new and changed records in a print data file 26 in step 72.

In step 74, overlay data management program 32 calls overlay printing application to print the overlay data in print data file 26 on overlay media. Overlay data management program 32 may immediately print the information or wait until a predetermined scheduled time or until a script file is executed.

In step 76, the method ends.

Figure 5:
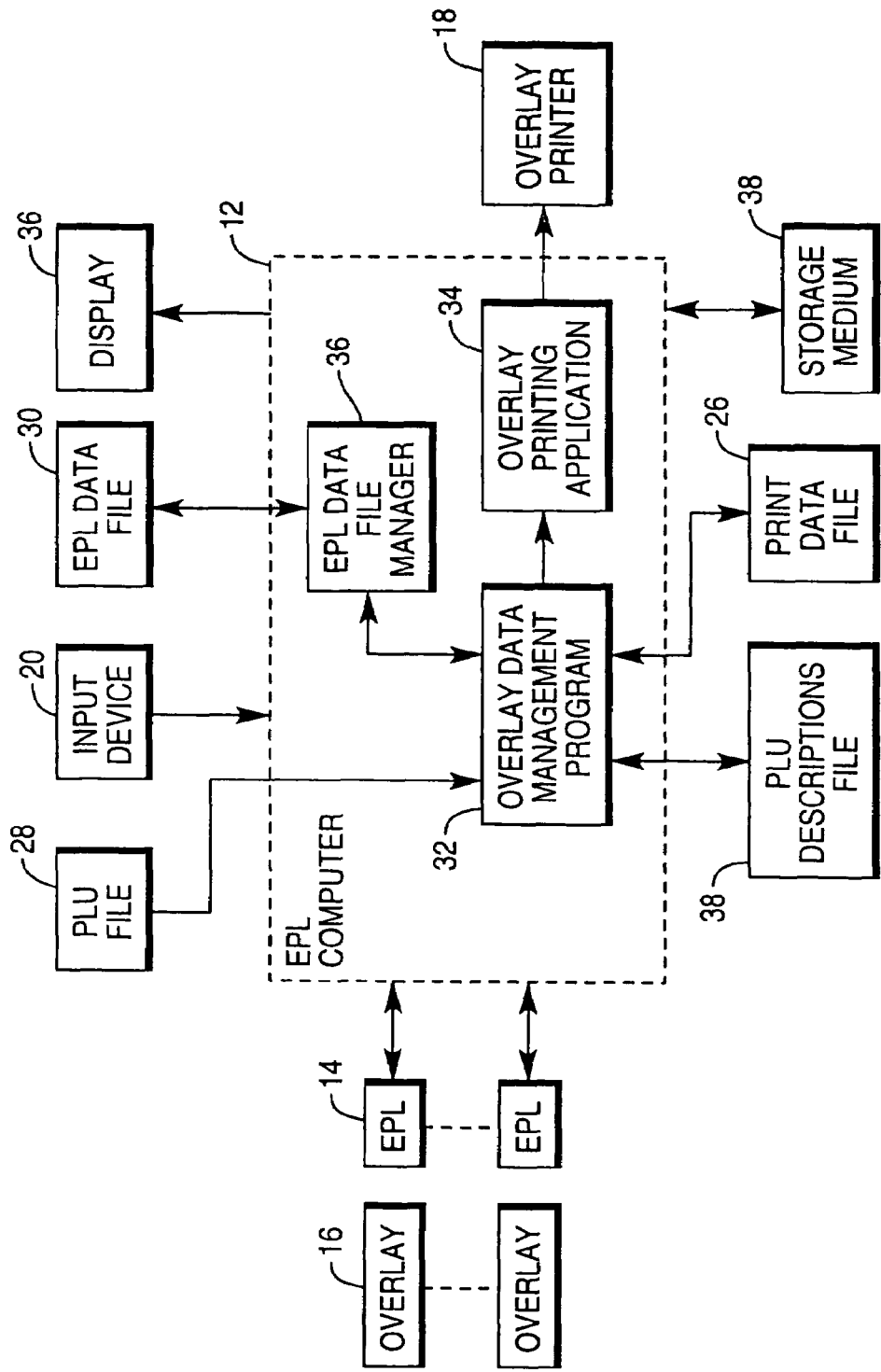
FIG. 5 is a block diagram of a third embodiment of the system of the present invention.

Referring now to FIG. 5, a third embodiment of electronic shelf label system 10 is similar to the second embodiment of FIG. 3, except that PLU descriptions are stored by overlay data management application in a PLU descriptions file 38. Overlay data file management program 32 maintains PLU descriptions in PLU descriptions file 38. Overlay data file management program 32 may operate in the background to update PLU descriptions file 38 at predetermined scheduled times. As in the second embodiment, EPL data file manager 36 makes changes to EPL data file 30 and marks new and updated EPL records with one or more dirty bits.

Overlay data management program 32 executes one of a plurality of printing choices, such as those described in FIGS. 7-11. One or more of the printing options may involve reading EPL data file 30 for records marked by dirty bits and comparing PLU descriptions file 38 to PLU data file 28 to determine descriptions within PLU data file 28 that have been added or changed since the creation of PLU descriptions file 38. Overlay data management application 32 creates print data file 26, which contains overlay data from marked EPL records and added or changed PLU descriptions.

Figure 6:
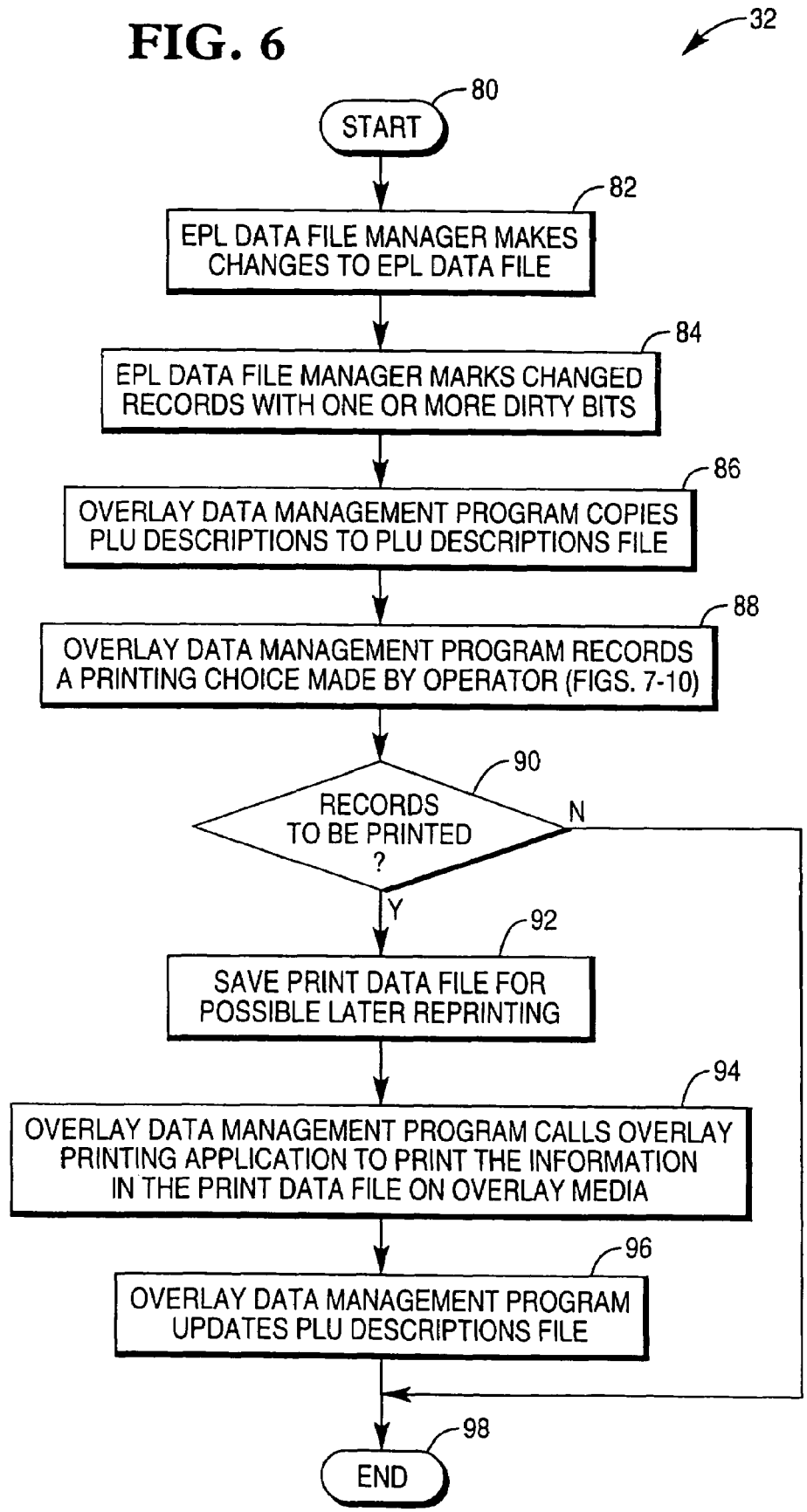
FIG. 6 is a flow diagram illustrating the operation of the third embodiment of FIG. 5.

Thus, turning now to FIG. 6, the operation of overlay data management program 32 under the third embodiment of the present invention is illustrated in more detail beginning with START 80.

In step 82, EPL data file manager 36 makes changes to EPL data file 30.

In step 84, EPL data file manager 36 marks new and changed EPL records with one or more dirty bits.

In step 86, overlay data management program 32 copies PLU descriptions to PLU descriptions file 38. These PLU descriptions can be obtained at the time or at an earlier time, before changes are made to EPL data file 30.

In step 88, overlay data management program 32 records a printing choice by an operator to print overlay data.

In step 90, overlay data management program 32 determines whether print data file 26 contains any records to be printed. If there are none, the method ends in step 98.

If there are records in print data file 26, overlay data management program 32 saves print data file 26 to a storage medium, such as a fixed disk drive, for possible reprinting later in step 92. Print data file 26 is saved because it cannot be recreated if the printing process is canceled or fails. This is because overlay data management program 32 cleans out any dirty bits during execution of the printing choices.

In step 94, overlay data management program 32 calls overlay printing application 34 in step 104 to print the overlay data in print data file 26 on overlay media.

In step 96, overlay data management program 32 updates PLU descriptions file 38.

In step 98, the method ends.

Turning now to FIGS. 7-11, various printing options are explained in more detail. In these options, dirtiness using dirty bit masks, which are user-configurable filters that determine fields defining the dirtiness of a record.

Figure 7:
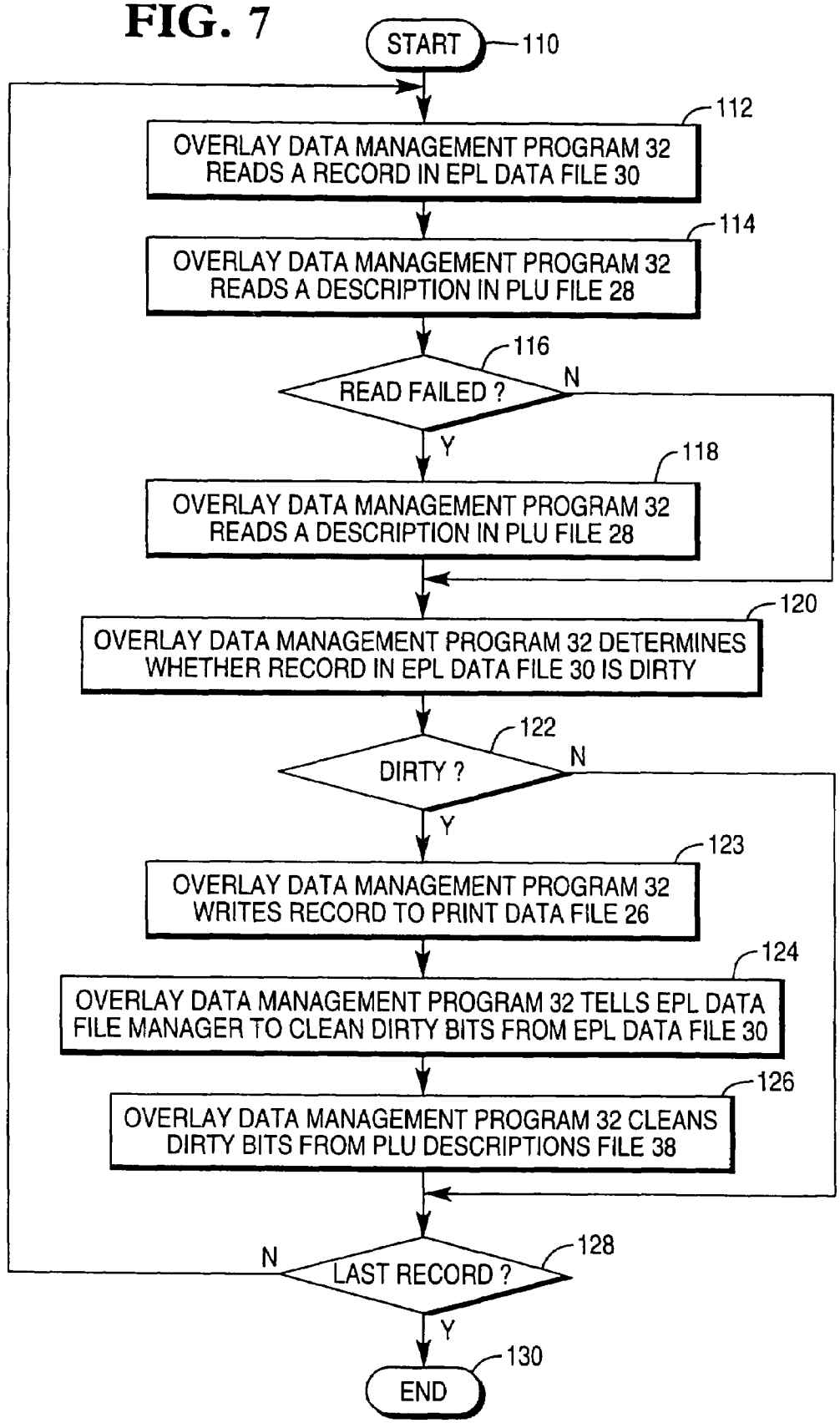
FIG. 7 is a flow diagram illustrating a first printing choice within the third embodiment of FIG. 5.

FIG. 7 describes a 'Quick Print' option, beginning with START 110, which is used to print records within EPL data file 30 which are dirty. The Quick Print operation is useful because it avoids timely PLU file lookups for description changes.

Thus, in step 112, overlay data management program 32 reads a record in EPL data file 30.

In step 114, overlay data management program 32 reads a description in PLU descriptions file 38.

In step 116, if the read fails, overlay data management program 32 reads the description from PLU file 28 in step 118 and the method proceeds to step 120. If the read does not fail, the method proceeds directly to step 120.

In step 120, overlay data management program 32 determines whether the record in EPL data file 30 is dirty. If it is not, the method proceeds to step 128 to check another record or end. If the record is dirty, the method proceeds to step 123.

In step 123, overlay data management program 32 writes the dirty record to print data file 26.

In step 124, overlay data management program 32 tells EPL data file manager 36 to clean dirty bits from the record.

In step 126, overlay data management program 32 cleans dirty bits for the record from PLU descriptions file 38.

In step 128, the method determines whether the record is the last record in EPL data file 30. If not, the method returns to step 112. If so, the method ends in step 130.

Figure 8:
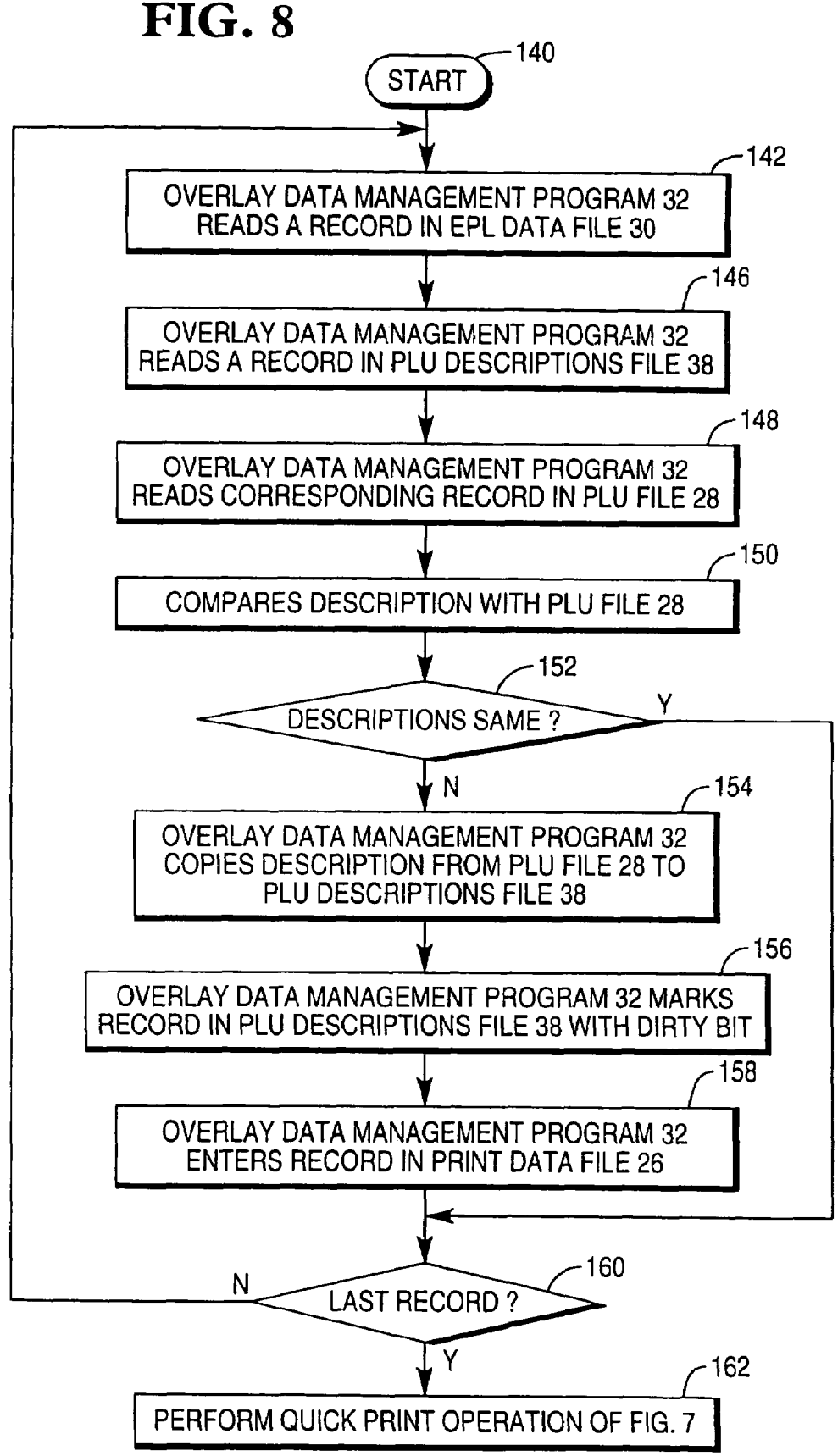
FIG. 8 is a flow diagram illustrating a second printing choice within the third embodiment of FIG. 5.

FIG. 8 illustrates a "Print All Changes" operation, beginning with START 140. The Print All Changes option differs from the Quick Print option in that it forces a scan by overlay data management program 32. When invoked, the Print All Changes option calls overlay data management program 32 with a special message that causes overlay data management program 32 to restart its scan of EPL data file 30 with the fastest possible search values. Overlay printing application polls the status of overlay data management program 32 periodically and waits for the newly started scan to complete.

Thus, in step 142, overlay data management program 32 reads a record in EPL data file 30.

In step 146, overlay data management program 32 reads a record in PLU descriptions file 38.

In step 148, overlay data management program 32 reads the corresponding record in PLU file 28.

In step 150, overlay data management program 32 compares the descriptions in PLU descriptions file 38 with descriptions in PLU file 28.

In step 152, overlay data management program 32 determines whether the descriptions are the same. If they are, the method proceeds to step 160 to review another record or implement the Quick Print operation in step 162. If they are not, the method proceeds to step 154.

In step 154, overlay data management program 32 copies the description from PLU file 28 to PLU descriptions file 38.

In step 156, overlay data management program 32 marks the record in PLU descriptions file 38 with a dirty bit.

In step 158, overlay data management program 32 enters the record in print data file 26. Thus, if a record in EPL data file 30 is dirty, or a record in PLU descriptions file 26 is dirty, or if a comparison of a PLU descriptions file with PLU file 28 indicates that a record in PLU descriptions file should be changed, overlay data management program 32 records the corresponding record data in print data file 26.

In step 160, overlay data management program 32 determines whether the record is the last record. If not, the method proceeds to step 142. If so, the method proceeds to step 162 to perform a Quick Print operation.

Figure 9:
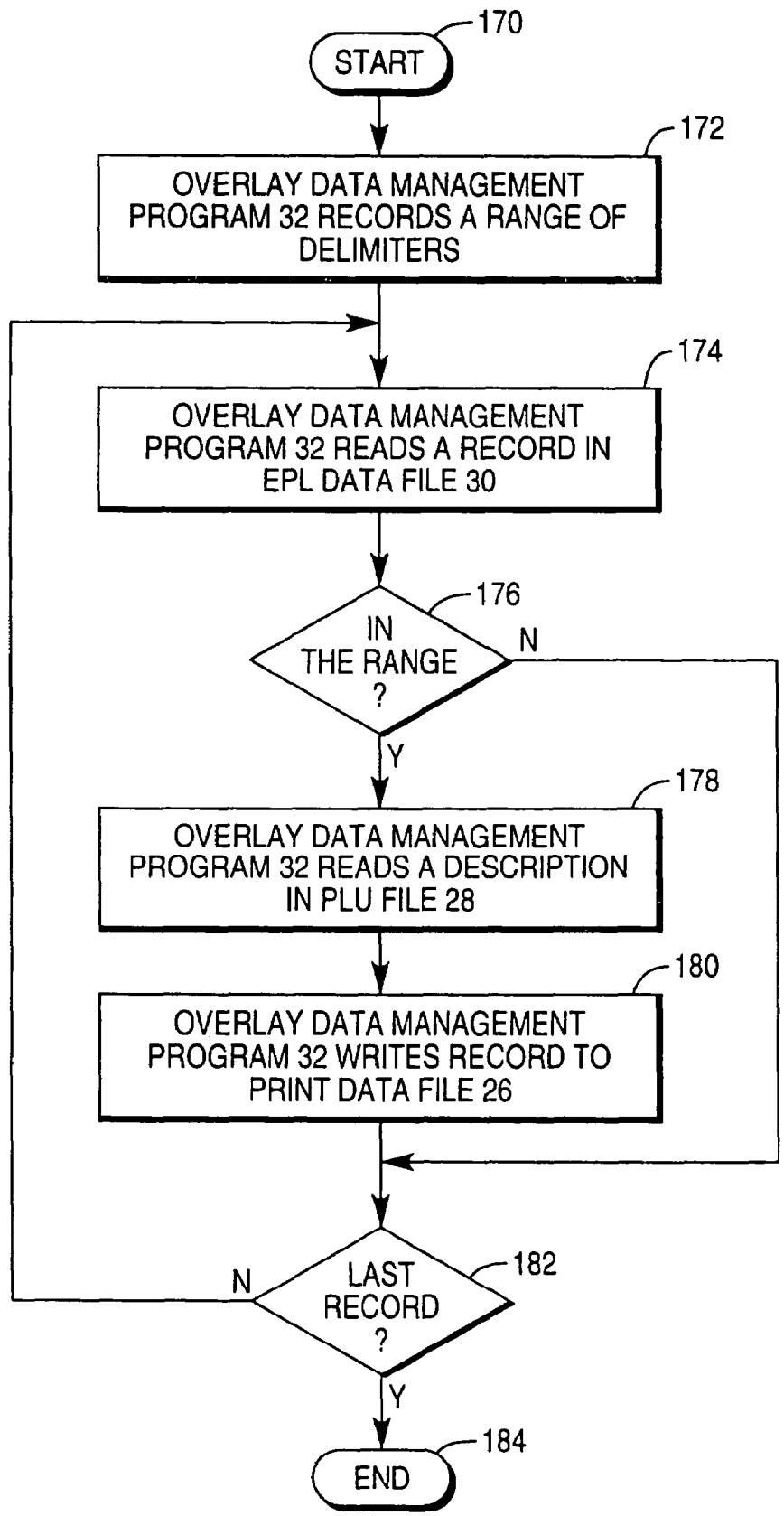
FIG. 9 is a flow diagram illustrating a third printing choice within the third embodiment of FIG. 5.

FIG. 9 illustrates the Selective Print operation, beginning with START 170. The Selective Print option allows a user to print a specific overlay or range of overlays based upon selected PLU numbers, EPL serial numbers, or range of EPL installation dates. This option does not change the dirty bits for the given record, nor does it consider the dirty mask.

Thus, in step 172, overlay data management program 32 records a range of delimiters for the operation. Delimiters may include PLU numbers, EPL serial numbers, EPL installation dates, etc.

In step 174, overlay data management program 32 reads a record in EPL data file 30.

In step 176, overlay data management program 32 determines whether the record is within the range of item numbers. If it is not, the method proceeds to step 182 to read another record from EPL data file 30 or end at step 184. If the record is within the range of item numbers, the method proceeds to step 178.

In step 178, overlay data management program 32 reads a description from PLU file 28.

In step 180, overlay data management program 32 writes the records to print data file 26.

In step 184, overlay data management program 32 determines whether the record is the last record in EPL data file 30. If it is not, the method returns to step 174. If it is, the method ends at step 184.

Figure 10:
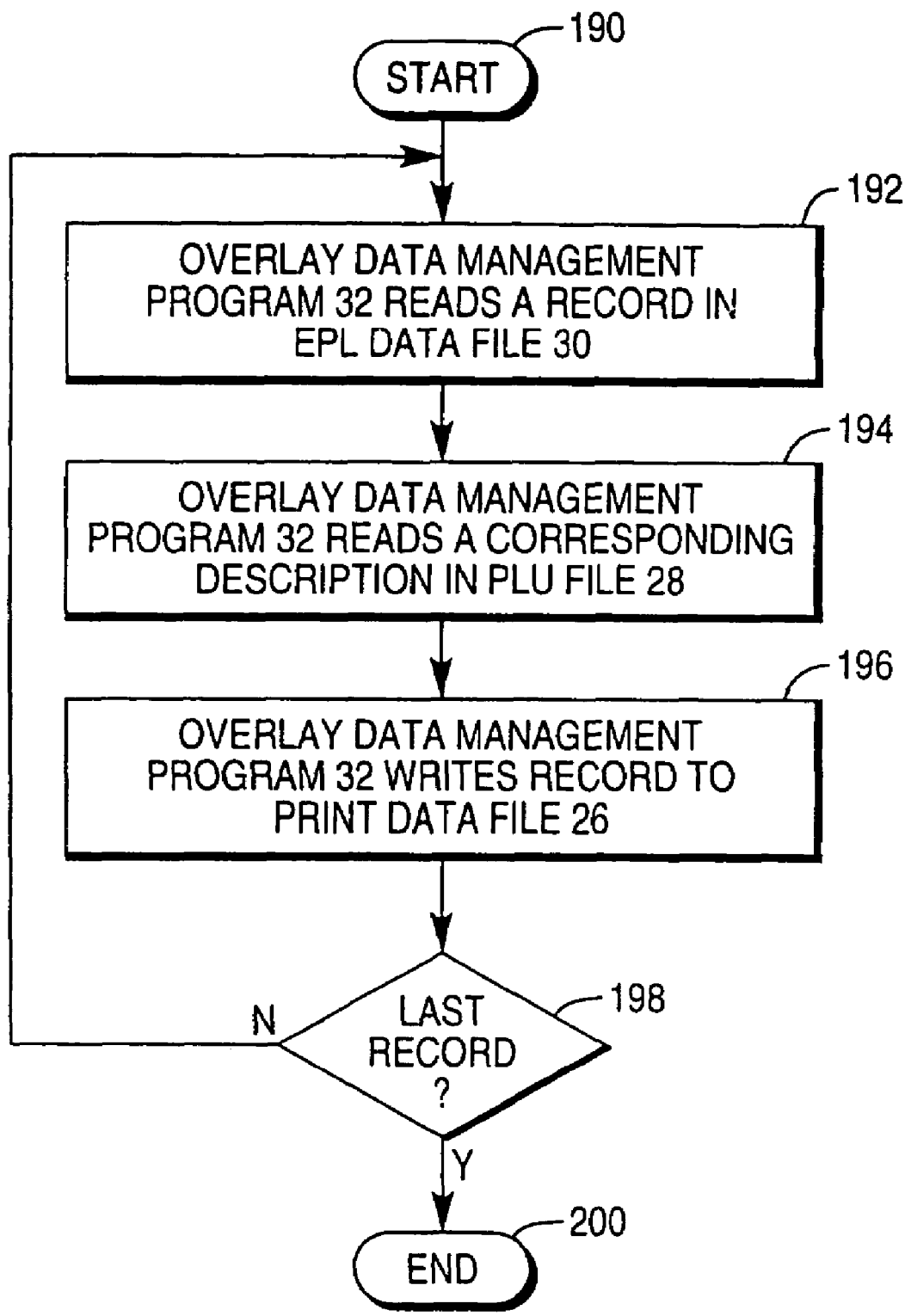
FIG. 10 is a flow diagram illustrating a fourth printing choice within the third embodiment of FIG. 5.

FIG. 10 illustrates the Print All operation, beginning with START 190. This option prints all the records in EPL data file 30 regardless of the dirty bits and dirty mask and has no affect on the dirty bit settings.

Thus, in step 192, overlay data management program 32 reads a record in EPL data file 30.

In step 194, overlay data management program 32 reads a corresponding record in PLU file 28.

In step 196, overlay data management program 32 writes the records to print data file 26.

In step 198, overlay data management program 32 determines whether the record is the last record. If not, the method returns to step 192. If so, the method ends at 200.

FIG. 11 illustrates the Print Previous Labels operation, beginning with START 210. This option prints all the records in a previously-saved print data file 26.

Thus, in step 212, overlay data management program 32 records one of the following types of print data files 26 to be printed: a Quick Print print data file, a Print All print data file, and a Selective Print print data file (generated from the operations illustrated in FIGS. 7-10).

In step 214, overlay data management program 32 displays print data files 26 generated from the chosen printing operation.

In step 216, overlay data management program 32 records a user choice for one of the displayed print data files 26.

In step 218, overlay data management program 32 provides the chosen print data file 26 to overlay printing application 34.

The method ends in step 220.

Although the present invention has been described with particular reference to certain preferred embodiments thereof, variations and modifications of the present invention can be effected within the spirit and scope of the following claims.

What is claimed is:

1. A system for managing EPL overlay data as the EPL overlay data changes during operation of an EPL system comprising:
   a number of storage media for storing a PLU file and an EPL data file; and
   a store based computer which determines a change in the PLU file and the EPL data file in the EPL system, and which creates a print file for printing an overlay for the change in the PLU file and EPL data file, wherein the computer reads the EPL data file for a marked change and compares PLU descriptions in a PLU descriptions file to the PLU file to determine the change;
   wherein the computer creates a master overlay data containing first data in the PLU file and the EPL data file, creates a temporary overlay data file containing second data in the PLU file and the EPL data file, and compares the master overlay data file to the temporary overlay data file to determine a third set of data representing the change.

2. The system of claim 1 wherein the computer operates in conjunction with an overlay data management program which creates the master overlay data file and the temporary overlay data file in addition to said print file.

3. The system of claim 2 wherein the master overlay data file includes descriptions of products from the PLU file.

4. The system of claim 2 wherein the master overlay data file includes information from within the EPL data file including PLU number, measure, unit of measure, package size, EPL serial number and price level.

5. The system of claim 2 wherein the temporary overlay data file includes new and updated descriptions of products from the PLU file and the EPL data file since creation of the master overlay data file.

6. The system of claim 5 wherein the print data file contains overlay information for new and updated records and results from a comparison of the master overlay data file with the temporary overlay data file by the overlay data management program.

7. The system of claim 1 further comprising an overlay printer which prints an overlay for the print file upon receipt of a print command from the computer.

8. The system of claim 1 further comprising an EPL data file manager which marks each EPL record stored in the EPL data file with one or more flags or dirty bits, as each EPL record is added or changed by the EPL data file manager.

9. The system of claim 8 wherein the computer operates in conjunction with an overlay data management program which operates to determine said change in the EPL data file by reading the EPL data file for records marked with one or more flags or dirty bits.

10. The system of claim 8 further comprising user-configurable filters that determine fields defining the dirtiness of a record.

11. The system of claim 1 further comprising a storage medium for storing the print file for possible reprinting later.

12. A system for managing EPL overlay data as the EPL overlay data changes during operation of an EPL system comprising:
   a number of storage media for storing a PLU file and an EPL data file; and
   a store based computer which determines a change in the PLU file and the EPL data file in the EPL system, and which creates a print file for printing an overlay for the change in the PLU file and EPL data file, wherein the computer reads the EPL data file for a marked change and compares PLU descriptions in a PLU descriptions file to the PLU file to determine the change;
   wherein the computer creates a master overlay data containing first data in the PLU file and the EPL data file, creates a temporary overlay data file containing second data in the PLU file and the EPL data file, and compares the master overlay data file to the temporary overlay data file to determine a third set of data representing the change.

* * * * *